US009300202B2

(12) United States Patent
Laur et al.

(10) Patent No.: US 9,300,202 B2
(45) Date of Patent: Mar. 29, 2016

(54) SYSTEM AND METHOD OF DYNAMIC DROOP FOR SWITCHED MODE REGULATORS

(75) Inventors: Steven P. Laur, Raleigh, NC (US); M. Jason Houston, Cary, NC (US); Rhys S. A. Philbrick, Cary, NC (US); Thomas A. Jochum, Durham, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 351 days.

(21) Appl. No.: 13/536,862

(22) Filed: Jun. 28, 2012

(65) Prior Publication Data

US 2013/0300392 A1 Nov. 14, 2013

Related U.S. Application Data

(60) Provisional application No. 61/645,264, filed on May 10, 2012.

(51) Int. Cl.
*H02M 3/156* (2006.01)
*H02M 1/00* (2007.01)
*H02M 3/158* (2006.01)

(52) U.S. Cl.
CPC ............ *H02M 3/156* (2013.01); *H02M 3/1588* (2013.01); *H02M 2001/0025* (2013.01); *H02M 2001/0032* (2013.01); *H02M 2003/1566* (2013.01); *Y02B 70/1466* (2013.01); *Y02B 70/16* (2013.01)

(58) Field of Classification Search
CPC .............. H02M 3/156; H02M 3/1588; H02M 2003/1566; H02M 2001/0032; H02M 2001/0025; H02M 3/158; H02M 7/797; H02M 3/07; G05G 1/40; G05F 1/10
USPC .......................... 323/234, 271, 282–285, 351
See application file for complete search history.

(56) References Cited

U.S. PATENT DOCUMENTS

| 6,271,651 | B1 * | 8/2001 | Stratakos et al. ............. 323/282 |
| 6,677,736 | B1 * | 1/2004 | Barnes et al. ................. 323/280 |
| 8,417,980 | B1 * | 4/2013 | Mimberg .................. G06F 1/26 323/234 |
| 2005/0200340 | A1 * | 9/2005 | Jochum et al. ................ 323/280 |

(Continued)

OTHER PUBLICATIONS

"2-Phase/1-Phase QuickTune-PWM Controller with Serial I²C Interface." MAX15569 Maxim Integrated 19-6646; Rev. 1; Feb. 2015 pp. 1-41.

(Continued)

*Primary Examiner* — Fred E Finch, III
*Assistant Examiner* — Gustavo Rosario Benitez
(74) *Attorney, Agent, or Firm* — Gary Stanford; Huffman Law Group, PC

(57) ABSTRACT

A regulator system with dynamic droop including a regulator control network which is adapted to control regulation of an output voltage to a reference level, a DC droop network which provides a droop signal to modify the reference level based on output load according to a predetermined DC load line, and a dynamic droop network which adjusts the droop signal to delay recovery to the predetermined DC load line within an AC load line tolerance in response to a load transient. A transient reduction network may be included to reduce transient overshoot for load insertion or release depending upon duty cycle type. The dynamic droop network adjusts the droop signal to optimize utilization of an AC delay parameter while transitioning between an AC offset voltage allowance and the predetermined DC load line.

20 Claims, 7 Drawing Sheets

(56) References Cited

U.S. PATENT DOCUMENTS

| | | | |
|---|---|---|---|
| 2006/0055388 A1* | 3/2006 | Tang et al. | 323/284 |
| 2008/0258701 A1* | 10/2008 | Liu | H02M 3/1588 323/328 |
| 2009/0140711 A1* | 6/2009 | Philbrick et al. | 323/285 |
| 2009/0174262 A1* | 7/2009 | Martin et al. | 307/82 |
| 2010/0156375 A1* | 6/2010 | Bianco et al. | 323/283 |
| 2011/0316495 A1* | 12/2011 | de Nie | H02M 3/157 323/234 |

OTHER PUBLICATIONS

"ADP3212, NCP3218, NCP3218G: 7-Bit, Programmable, 3-Phase, Mobile CPU Synchronous Buck Controller." Semiconductor Components Industries, LLC. Aug. 2012, Rev.4 Publication Order No. ADP3212/D. pp. 1-35.

Wang, Xiangcheng "High Slew Rate High-Efficiency DC-DC Converter." A dissertation submitted in partial fulfillment of the requirements for the degree of Doctor of Philosophy in the School of Electrical Engineering and Computer Science in the College of Engineering and Computer Science at the University of Central Florida Orlando, Florida. Summer Term 2006. pp. 1-207.

Yao, Kaiwei et al. "Optimal Design of the Active Droop Control Method for the Transient Response." 2003 IEEE. Center for Power Electronics Systems, The Bradley Department of Electrical and Computer Engineering Virginia Polytechnic Institute and State University, Blacksburg, VA 24061 USA. pp. 718-723.

\* cited by examiner

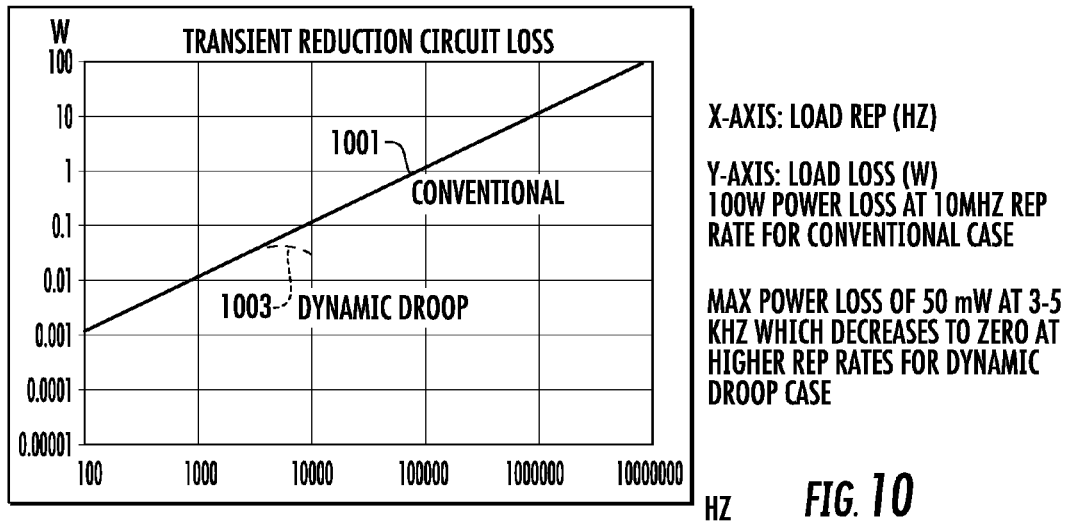
FIG. 10
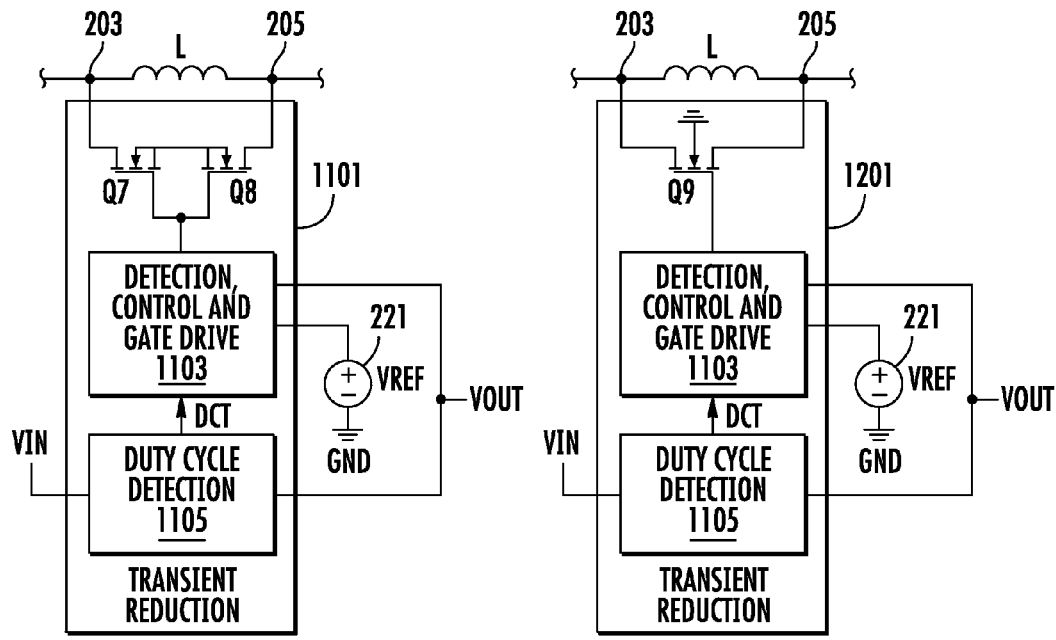
FIG. 11
FIG. 12

SYSTEM AND METHOD OF DYNAMIC DROOP FOR SWITCHED MODE REGULATORS

CROSS-REFERENCE TO RELATED APPLICATIONS

This application claims the benefit of U.S. Provisional Application Ser. No. 61/645,264, filed on May 10, 2012, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which:

FIG. 10 is a chart plotting power loss (in Watts, W) versus load repetition rate (Hz) for a particular configuration;

FIG. 11 is a block diagram of a transient reduction network implemented according to an alternative embodiment which combines the functions of the transient reduction networks of FIG. 6; and FIG. 12 is a block diagram of a transient reduction network implemented according to another alterative embodiment which combines the functions of the transient reduction networks of FIG. 6.

DETAILED DESCRIPTION

Figure 1:
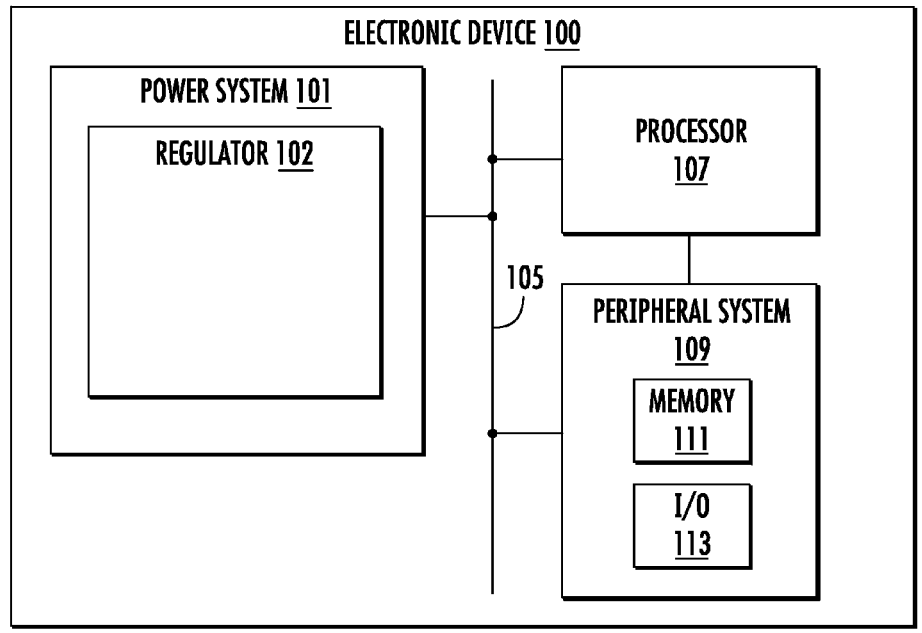
FIG. 1 is a simplified block diagram of an electronic device configured with a power system having a regulator which is implemented with dynamic droop according to an embodiment of the present invention.

The benefits, features, and advantages of the present invention will become better understood with regard to the following description, and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Voltage droop is the intentional adjustment of output voltage of a switched mode regulator in response to the level of output load. When the load is light, the output voltage may be regulated to a higher voltage level. As the load increases, the output voltage is regulated to proportionately lower voltage levels based on the load level. The relationship between the output voltage and the load is typically determined by a DC load line specification (or DC droop). An AC load line specification (or AC droop) provides a level of tolerance during load transitions. Generally, the AC load line tolerance provides for a voltage allowance offset and an delay parameter that determines by how much the output voltage is allowed to deviate from the DC load line specification and for how long in response to load transitions or transients.

The conventional droop response time on both rising and falling edges of the output signal in response to load transients was typically the same. The edges and the speed of response were not adjustable. Conventional droop networks contain one or two symmetrical droop levels for both AC and DC droop.

It has been determined that there are circumstances under which a dynamic droop response based on the duty cycle is desirable to provide optimal transient recovery. In a low duty cycle application for a buck-type converter, it is desired to have slow droop response for load insertion and then fast droop response for load release. In the high duty cycle application for a buck-type converter, it is desired to have fast droop response for load insertion then slow droop response for load release. In general, a dynamic droop configuration as described herein operates to optimize utilization of the AC delay parameter while transitioning from the AC offset voltage tolerance to the DC load line specification.

A buck-type switching regulator converts a higher input voltage VIN to a lower regulated output voltage VOUT. The duty cycle "D" generally refers to the ratio between the on-time and the period of the pulse width modulation (PWM) control signal generated by the regulator to control the voltage conversion. The duty cycle generally determines the relationship between VIN and VOUT during steady state conditions, where VOUT≈D·VIN. It is understood that the duty cycle changes in response to load transients, such as by increasing during load insertion transients and by decreasing during load release transients; duty cycle type is the general relationship between the input and output voltage during steady state conditions. A low duty cycle application or type is one in which the ratio of the output voltage VOUT to the input voltage VIN is relatively low during steady state conditions, such as when the input voltage is relatively high and/or the output voltage is relatively low (e.g., a relatively large difference between VOUT and VIN). A high duty cycle application or type is one in which the ratio of the output voltage VOUT to the input voltage VIN is relatively high during steady state conditions, such as when the input voltage is relatively low and/or the output voltage is relatively high (e.g., a relatively small difference between VOUT and VIN).

FIG. 1 is a simplified block diagram of an electronic device 100 configured with a power system 101 having a regulator 102 which is implemented with dynamic droop according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a bus 105, which includes any combination of power and/or signal conductors. In the illustrated embodiment, the peripheral system 109 may include any combination of a system memory 111 (e.g., including any combination of RAM and ROM type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other type of electronic devices (e.g., media player, recording device, etc.). The power system 101 may be configured to include a battery (rechargeable or non-rechargeable) and/or may be configured to operate with an alternating current (AC) adapter or the like.

Figure 2:
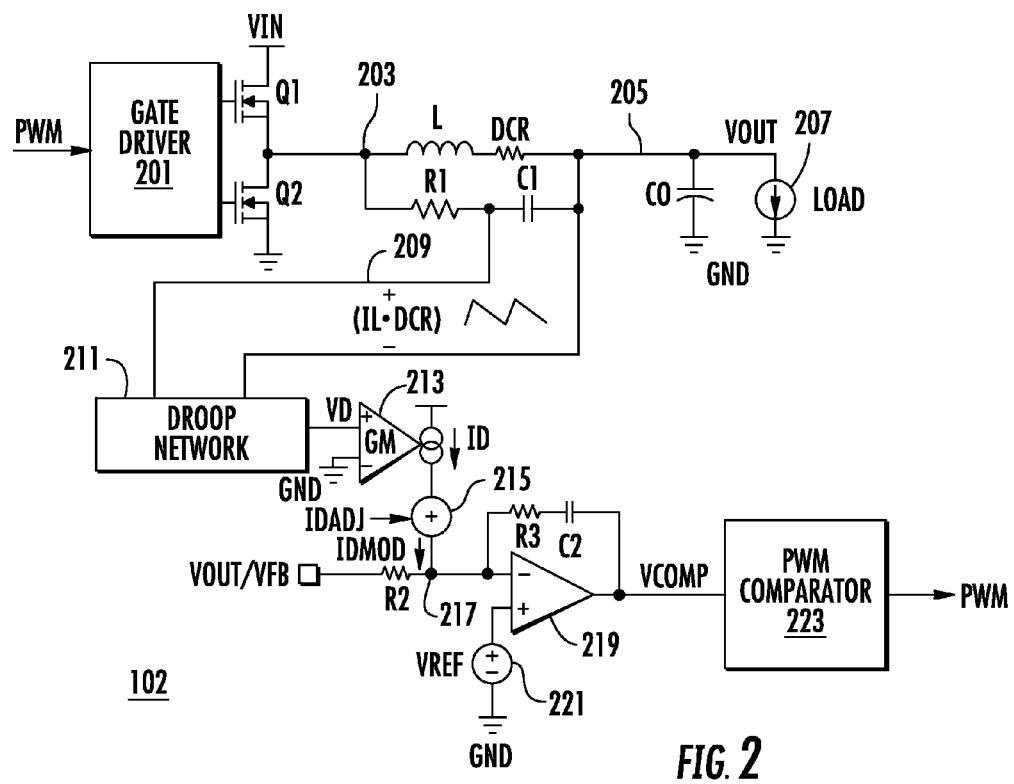
FIG. 2 is a simplified schematic and block diagram of an exemplary regulator of FIG. 1 which is implemented with dynamic droop according to an embodiment of the present invention.

FIG. 2 is a simplified schematic and block diagram of an exemplary regulator 102 which is implemented with dynamic droop according to an embodiment of the present invention. Although not shown in FIG. 2, the regulator 102 may further include a transient reduction network as further described herein. A single phase is illustrated in which it is understood that multiphase regulators are also contemplated. The regulator 102 includes a gate driver 201 receiving a pulse control or PWM signal and providing respective gate drive signals to an upper electronic switch Q1 and a lower electronic switch Q2. The electronic switches Q1 and Q2 have their current terminals (e.g., drains and sources) coupled series between an input voltage VIN and a common reference voltage shown as ground (GND). It is noted that GND generally represents one or more reference nodes, such as one or more ground levels or nodes (e.g., signal ground, power ground, chassis ground, etc.), or one or more reference nodes at any other positive or negative reference voltage level. The switches Q1 and Q2 are coupled together at an intermediate phase node 203 developing a corresponding phase voltage. The output inductor L has one end coupled to the phase node 203 and its other end coupled to an output node 205 developing an output voltage VOUT. An output capacitor CO and a LOAD 207 are coupled between the output node 205 and GND. The LOAD 207 generally represents one or more loads, such as, for example, the processor 107 and/or any one or more devices of the peripheral system 109.

VOUT or a feedback signal VFB indicative of VOUT is provided to an input of an integrating error amplifier 219 via a compensation network or the like. VFB may be a sensed or proportional signal indicative of VOUT, such as developed by a voltage divider or the like (not shown). As shown, VOUT (or VFB) is provided to one end of a resistor R2, with its other end coupled to a node 217 which is further coupled to one end of a resistor R3 and to the negative (−) or inverting input of the error amplifier 219. The resistor R3 is coupled in series with a capacitor C2 between the negative input and an output of the error amplifier 219. A voltage source 221 develops a reference voltage VREF relative to GND, in which VREF is provided to the positive (+) or non-inverting input of the error amplifier 219. R2, R3 and C2 collectively form an RC compensation network, in which the error amplifier 219 develops a compensation signal VCOMP at its output. VCOMP is provided to the input of a PWM comparator network 223, which develops the PWM signal at its output for controlling the regulator 102.

A resistor DCR is shown coupled in series with the inductor L, in which DCR is not a separate physical resistor but instead represents the DC resistance of the inductor L. The current through the inductor IL may be sensed by sensing the voltage across DCR. As shown, a resistor R1 and a capacitor C1 are coupled in series with each other and placed across the inductor L. A node 209 at the intermediate junction of R1 and C1 is coupled to one input of a droop network 211, and the output node 205 is provided to another input of the droop network 211. The voltage developed across C1 (between nodes 205 and 209) is a voltage IL·DCR for sensing inductor current. The droop network 211 develops a droop voltage VD which is provided to a positive input of a transconductance amplifier 213, having its negative input coupled to GND. The transconductance amplifier 213 converts the input voltage VD into a proportional droop current ID based on a transconductance gain GM.

In the conventional configuration, the droop current ID is injected into the control loop, such as into node 217 of the compensation network as illustrated, for providing the conventional droop function. In one embodiment, an adder 215 is interposed to add ID to a droop adjust current IDADJ to provide a modified droop current IDMOD. IDADJ is adapted to adjust ID to provide IDMOD to provide a desired dynamic droop adjustment to the conventional droop current as further described herein. The dynamic droop adjustment is based on the duty cycle configuration employed for the particular application. In the low duty cycle application, IDMOD is configured to provide slow droop response for load insertion then fast droop response for load release. In the high duty cycle application, IDMOD is configured to provide fast droop response for load insertion then slow droop response for load release.

When output voltage droop is not applied, the voltage VREF is used by the control loop to set the voltage level of VOUT to a predetermined reference level. The droop current injected into node 217 applies voltage droop to modify the reference level of VOUT according to the DC load line (DCLL) specification. The droop adjust current IDADJ further adjusts the droop current to delay recovery from the AC load line (ACLL) tolerance to the DC load line specification in response to a load transient. Although the output voltage remains within the AC load line tolerance, dynamic droop allows optimization of the AC delay parameter shown as ADP in FIG. 4, which defines the amount of time in which VOUT is allowed to deviate from DCLL, while transitioning to the DCLL in response to a load transient.

The droop voltage VDROOP is the desired difference between VREF and VOUT. The droop voltage is determined as VDROOP=IDMOD·R2. VDROOP is not explicitly developed at any particular node and it is not necessarily the voltage across the resistor R2 because other currents flow through R2 besides the modified droop current IDMOD. Nonetheless, VDROOP is readily determined based on IDMOD and R2.

Figure 3:
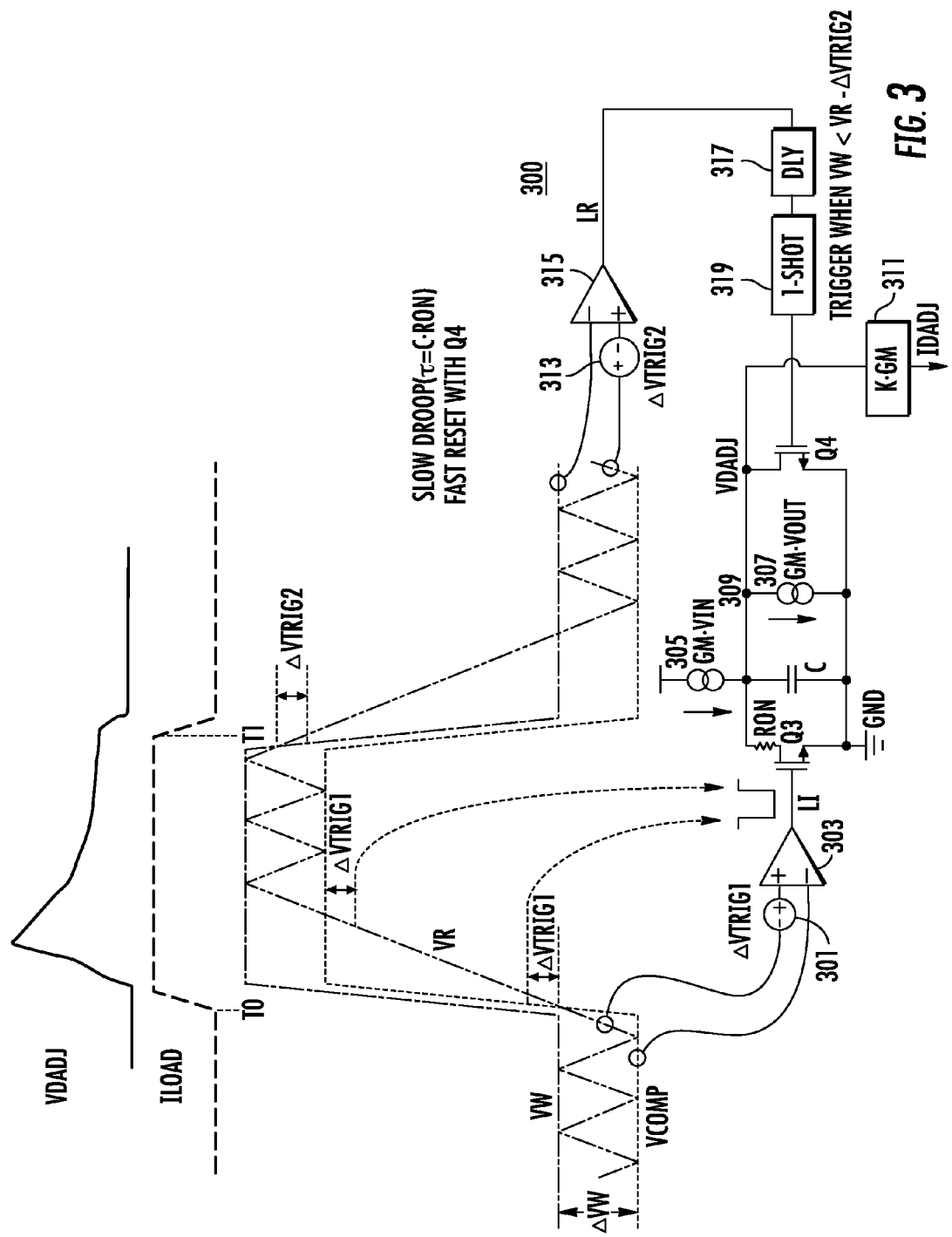
FIG. 3 is a simplified schematic and block diagram of a dynamic droop network implemented according to one embodiment for developing a droop adjust current for a low duty cycle application and a graphical representation illustrating operation.

FIG. 3 is a simplified schematic and block diagram of a dynamic droop network 300 implemented according to one embodiment for developing the droop adjust current IDADJ for a low duty cycle application (or type) and a graphical representation illustrating operation. In this particular configuration, the PWM comparator network 223 develops a window voltage VW which is separated from VCOMP by a window difference voltage ΔVW (ΔVW=VW−VCOMP). Although not shown, various methods are known for developing a window voltage, such as injecting a window current into a window resistor referenced to VCOMP. The PWM comparator network 223 further develops a ripple voltage which toggles between VCOMP (at the lower end) and VW (at the upper end) for developing PWM. For example, when VR falls to VCOMP, PWM is asserted high and VR ramps up until it reaches VW. When VR reaches VW, PWM is pulled low and VR ramps down again. Operation repeats in this manner for sequential cycles of PWM.

A voltage source 301 developing a first trigger voltage difference ΔVTRIG1 has its negative terminal referenced to VR and its positive terminal coupled to the positive input of a comparator 303. VCOMP is provided to the negative input of the comparator 303, which has its output providing a load insertion signal LI provided to the gate of an N-type field-effect transistor (FET) Q3. Other types of electronic switches are contemplated. Q3 has its source coupled to GND and its drain coupled to one end of a resistor RON. The other end of the resistor RON is coupled to a node 309 developing a droop adjust voltage VDADJ. A capacitor C is coupled between node 309 and GND. A current source 305 provides a current GM·VIN to node 309. A current sink 307 draws a current GM·VOUT from node 309 to ground. A transconductance device 311 has an input coupled to node 309 for receiving VDADJ and has an output providing the droop adjust current IDADJ. The transconductance device 311 has a gain factor GM·K in which GM is a transconductance gain and K is a gain factor. In this manner, the droop adjust voltage VDADJ is converted to the droop adjust current IDADJ.

In the illustrated embodiment, when Q3 is turned off, RON is effectively removed so that the net current of the current devices 305 and 307 charge the capacitor C using current GM·(VIN−VOUT). Since VIN is greater than VOUT, VDADJ ramps up when Q3 is off. When Q3 is turned on, RON is a series resistor having a suitable resistance to establish a resistor-capacitor (RC) time constant so that VDADJ ramps down at a desired rate. In an alternative embodiment, Q3 is a relatively small transistor and RON represents its drain-to-source resistance when Q3 is on, or $R_{DS\_ON}$. In this alternative embodiment, the size and/or configuration of Q3 is selected with RON (or $R_{DS\_ON}$) with a suitable resistance to ramp VDADJ down at a selected rate.

Another voltage source 313 developing a second trigger voltage difference ΔVTRIG2 has its positive terminal referenced to VR and its negative terminal coupled to the positive input of a comparator 315. VW is provided to the negative input of the comparator 315, which has its output providing a load release signal LR to an input of a delay device 317. The delay device 317 has an output coupled to an input of a 1-shot device 319, having its output coupled to the gate of another N-type field-effect transistor (FET) Q4. Q4 has its source coupled to GND and its drain coupled to node 309. Q4 is configured to quickly ground node 309 to discharge the capacitor C relatively quickly.

As shown in FIG. 3, a plot of the load current ILOAD is shown indicating the level of load, and a plot of the voltage of VDADJ is shown showing a corresponding response of VDADJ. ILOAD jumps up beginning at a time t0 from a lower level to a higher level in response to a load transient indicative of load insertion. ILOAD jumps back down a at a subsequent time t1 indicative of load release. VCOMP and VW increase quickly at time t0 in response to the load insertion, and then decrease quickly back to about the original level at time t1. The ramp voltage VR increases at a slew rate that is not as fast as VCOMP and VW so that both VCOMP and VW temporarily rise above VR in response to the load assertion. Similarly, VR decreases at a slew rate that is not as fast as VCOMP and VW so that both VCOMP and VW temporarily fall below VR in response to the load release.

The output LI of the comparator 303 is normally high and triggers low when VR is above VCOMP by ΔVTRIG1 indicating load insertion. The output LR of the comparator 315 is normally low and triggers high when VW falls below VR by ΔVTRIG2. VCOMP rising above VR by ΔVTRIG1 indicates a load insertion and activates a slow droop loop. The triggering of the comparator 315 is detected only when VW falls below VR by ΔVTRIG2 by a predetermined delay period determined by the delay device 317 to avoid triggering in response to spurious noise. VW falling below VR indicates load release and resets/disables the slow droop loop. The 1-shot device 319 has a predetermined time period when triggered sufficient to turn on Q4 for a sufficient time to reset/disable the slow droop loop (by discharging the capacitor C).

In operation, Q4 is normally off and Q3 is normally on to effectively minimize the voltage of the capacitor C to a low voltage or to zero. At load insertion after time t0 when VCOMP rises above VR by ΔVTRIG1, the comparator 303 triggers low turning off Q3 effectively removing RON. The current source 305 sources a current GM·VIN to charge the capacitor C and the current sink 307 sinks a current GM·VOUT, so that VDADJ ramps up at a rate of GM·(VIN−VOUT)/C soon after time t0 as illustrated. The voltage VDADJ is converted to the IDADJ current by the transconductance device 311, or IDADJ=K·GM·VDADJ. When VR rises above VCOMP−ΔVTRIG1, the comparator 303 turns Q3 back on so that RON is placed back in parallel with C. When Q3 is turned back on, the capacitor C is discharged and thus VDADJ ramps down based on a time constant RON·C. At load release at about time t1 when VW falls below VR by ΔVTRIG2, the comparator 315 is triggered for at least the delay of delay device 317 and the 1-shot device 319 pulses its output high for a sufficient period of time to turn Q4 on to discharge the capacitor C and pull VDADJ back to GND.

The VDADJ voltage of the illustrated dynamic droop network 300 may not settle at 0V and may have a small voltage level. It is desired, however, that IDADJ be zero during steady state conditions. Additional circuit components (not shown) may be included to ensure that VDADJ goes to 0V during steady state conditions when there are no load transients. Alternatively, a transmission gate or the like may be provided to block IDADJ when VDADJ is not changing in response to load transients.

Figure 4:
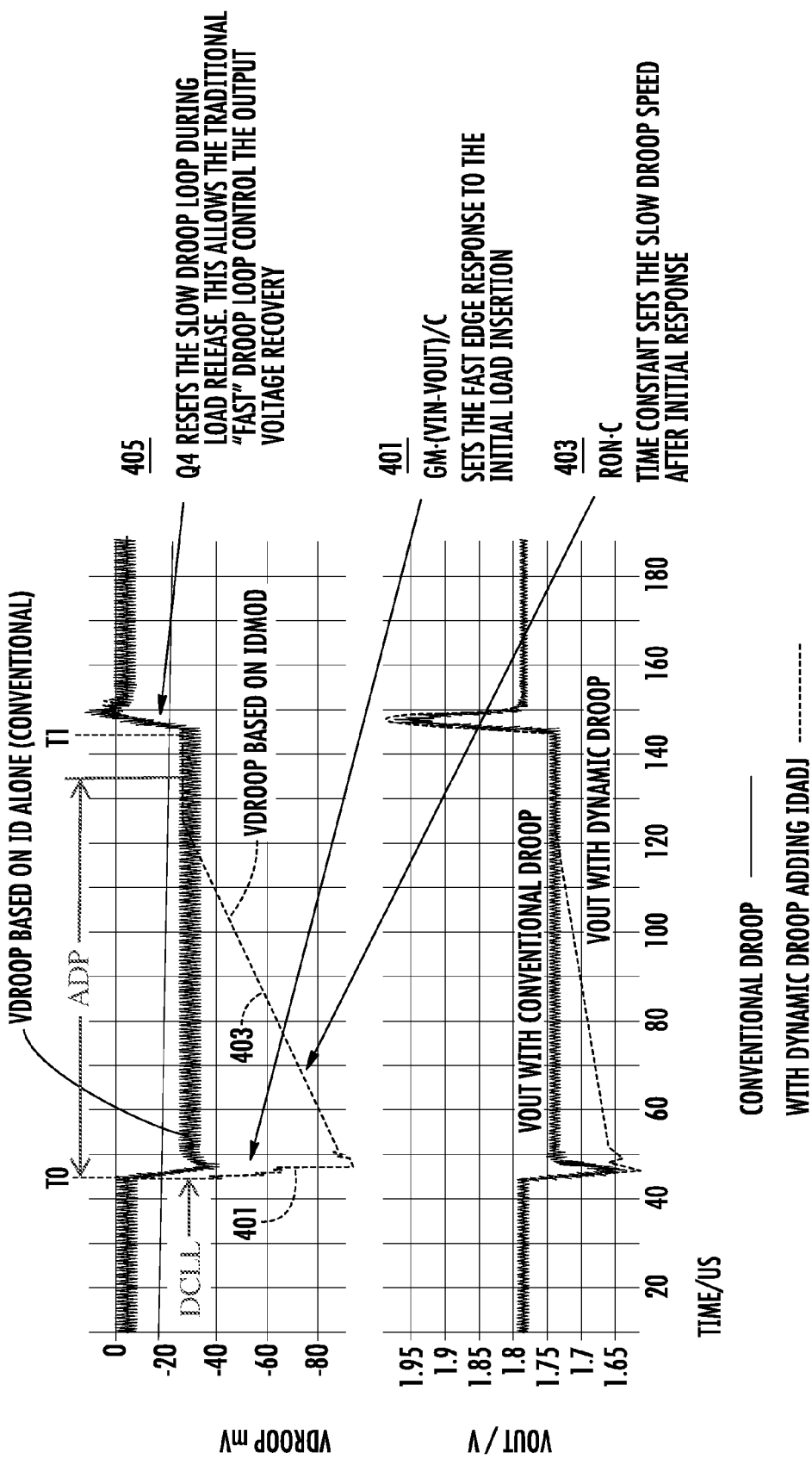
FIG. 4 is a timing diagram illustrating operation of the dynamic droop network of FIG. 3 according to one embodiment for the low duty cycle application compared with the corresponding signals for a conventional configuration.

FIG. 4 is a timing diagram illustrating operation of the dynamic droop network 300 according to one embodiment for the low duty cycle application (in which the ratio of VIN to VOUT is relatively high in steady state) compared with the corresponding signals for a conventional configuration. The droop voltage VDROOP and the corresponding output voltage transient of VOUT are plotted versus time in response to the load insertion and release between times t0 and t1 for both a conventional configuration (without IDADJ) and a configuration employing dynamic droop (IDMOD based on ID+IDADJ) using the dynamic droop network 300. At initial load insertion just after time t0, Q3 is turned off and GM·(VIN−VOUT)/C sets the fast edge response for dynamic droop as shown at 401. The contribution of IDADJ to ID causes the droop voltage to decrease faster to a lower value as compared with the conventional case. The VOUT transition does not drop by a significantly greater amount as compared to the conventional case. VOUT drops to a level based on an AC load line (ACLL) specification. Just after load insertion when the comparator 303 output goes high turning Q3 on, IDADJ ramps down based on the RON·C time constant, which causes VDROOP to ramp up as shown at 403. The conventional droop voltage jumps relatively quickly to a steady state level, and VOUT likewise settles back to a target level determined by the DC load line (DCLL) specification after load insertion. The dynamic droop sets the slow droop speed after the initial response so that VDROOP and the output voltage transient both ramp to the DCLL level more slowly. At load release just after time t1, Q4 is turned on to reset the slow droop loop as shown at 405, so that the dynamic droop signals substantially follow the conventional case for load release. This allows the conventional fast droop loop to control output voltage recovery.

It is noted that certain microprocessor specifications allow for a specified recovery time period for VOUT from AC load line droop level to the corresponding DC load line droop level. In one embodiment, specifications allow for a 500 microsecond (μs) recovery. The dynamic droop network 300 is configured so that VOUT reaches the DC load line level within the specified period or AC delay parameter (ADP), which begins at the load insertion time t0. Allowing the droop signal to recover more slowly provides significant benefits as described herein.

Figure 5:
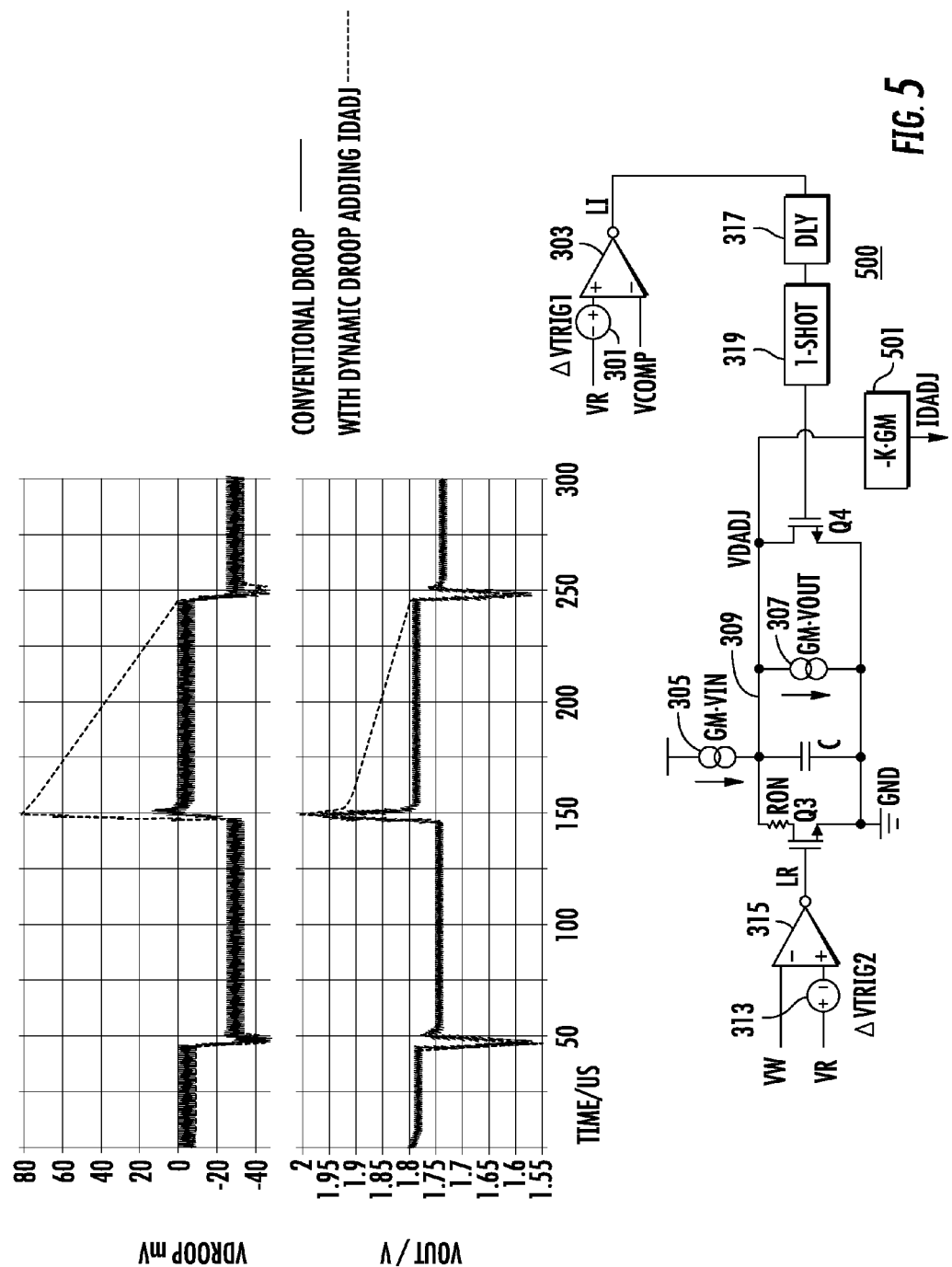
FIG. 5 is a timing diagram illustrating operation of a dynamic droop network implemented for the high duty cycle application according to one embodiment (in which the ratio of VIN to VOUT is relatively low) compared with the corresponding signals for a conventional configuration.

FIG. 5 is a timing diagram illustrating operation of a dynamic droop network 500 implemented for the high duty cycle application according to one embodiment (in which the ratio of VIN to VOUT is relatively low) compared with the corresponding signals for a conventional configuration. The dynamic droop network 500 is implemented for the high duty cycle application. The dynamic droop network 500 is substantially similar to the dynamic droop network 300 in which similar components assume identical reference numbers. For the droop network 500, the trigger networks for load insertion (voltage source 301 and comparator 303) and load release (voltage source 313 and comparator 315) are swapped with each other and the transconductance device 311 applies an inverted gain factor (−GM·K). As shown, the LR output of the comparator 315 is inverted (shown with an inverting output, although an inverter may be used as well) and provided to the gate of Q3 and the LI output of the comparator 303 is inverted and provided to the input of the delay device 317. Also, the transconductance device 311 is replaced by a transconductance device 501 which applies the inverted gain factor −GM·K. In the case of high duty cycle configurations (in which VIN is relatively low and/or VOUT is relative high), the dynamic loop response is fast for load insertion and then slow for load removal as illustrated.

Output capacitance is a main cost contributor to overall cost, specifically for core regulators for computing applications. It is desired to reduce the output capacitance as much as possible while maintaining efficiency at an acceptable level. Transient reduction networks, described further herein, permit a reduction of output capacitance.

Figure 6:
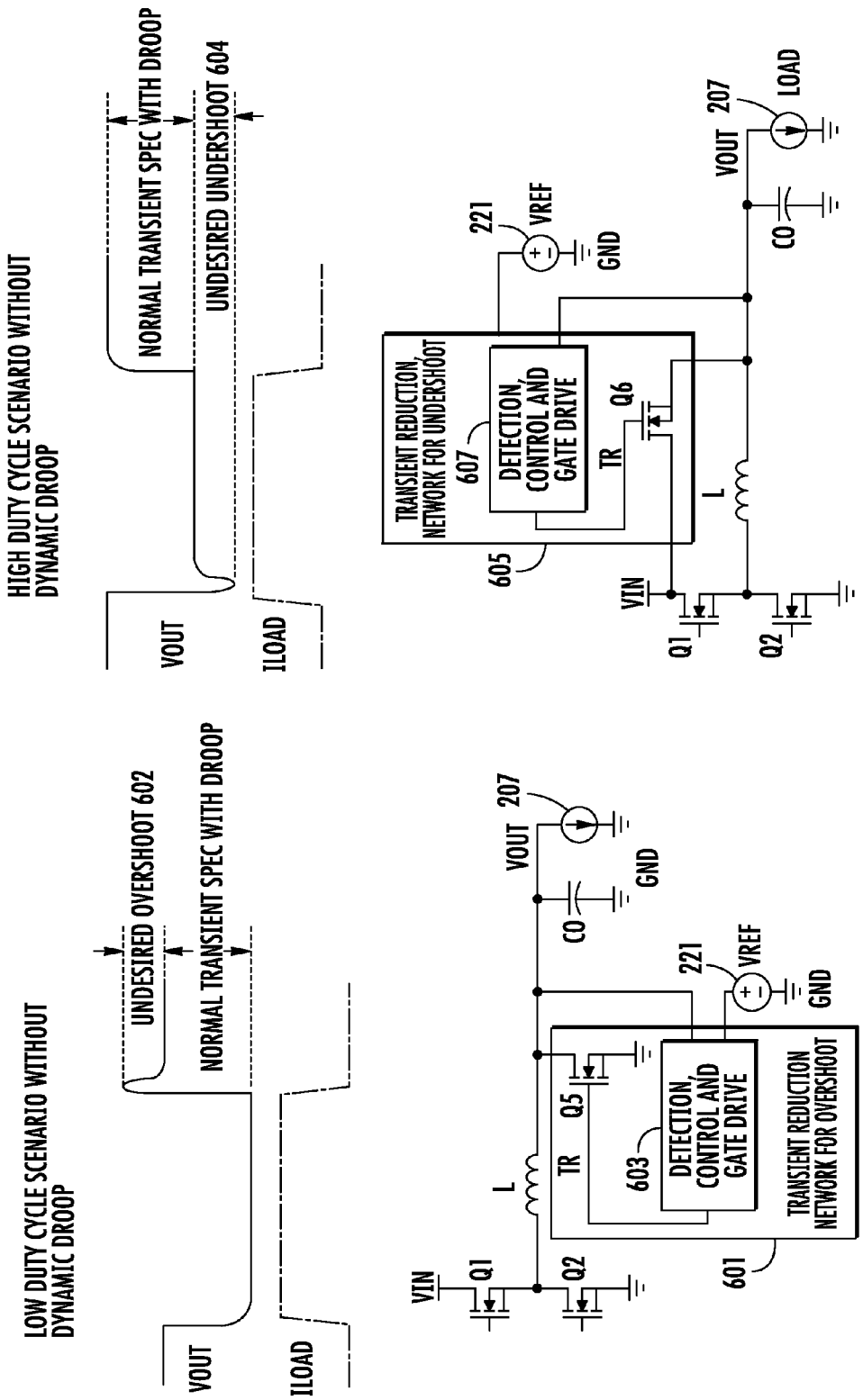
FIG. 6 is schematic and block diagram illustrating the output portion of the regulator of FIG. 1 including a transient reduction network for overshoot reduction for a low duty cycle application and a transient reduction network for undershoot reduction for a high duty cycle application.

FIG. 6 is schematic and block diagram illustrating the output portion of the regulator 102 including a transient reduction network 601 for overshoot reduction for a low duty cycle application and a transient reduction network 605 for undershoot reduction for a high duty cycle application. Also shown are timing diagram depictions illustrating operation without dynamic droop in which VOUT transitions quickly to the DCLL voltage level. In the low duty cycle application case, an undesired overshoot 602 occurs upon load release after load assertion. The transient reduction network 601 includes a detection control and gate drive network 603 and N-type metal-oxide semiconductor FET (MOSFET) Q5, in which the detection control and gate drive network 603 operates to compare VOUT with VREF and assert a transient reduction signal TR to turn on Q5 when VOUT rises above VREF by a predetermined amount. Q5 effectively reduces or otherwise removes the undesired overshoot 602 by temporarily drawing current from the output.

In the high duty cycle application case, an undesired undershoot 604 occurs upon load assertion. The transient reduction network 605 includes a detection control and gate drive network 607 and an N-type MOSFET Q6, in which the detection control and gate drive network 605 operates to compare VOUT with the desired output voltage and assert TR to turn on Q6 when VOUT falls below the desired output voltage by a predetermined amount. Q6 effectively reduces or otherwise removes the undesired undershoot 604 by temporarily passing current from VIN to VOUT.

Figure 7:
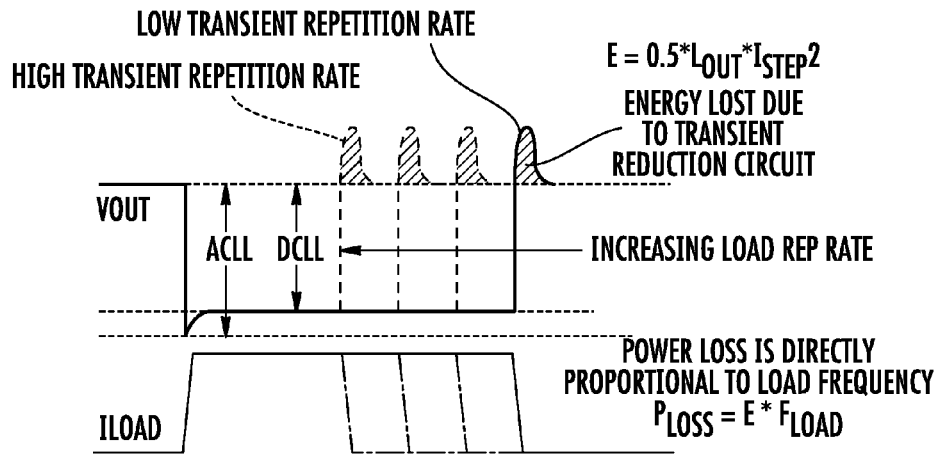
FIG. 7 is a graphic depiction illustrating energy (and thus power) loss based on frequency of load insertion/release (load transient repetition rate) for a regulator implemented with conventional droop and the transient reduction network of FIG. 6.

FIG. 7 is a graphic depiction illustrating energy (and thus power) loss based on frequency of load insertion/release (load transient repetition rate) for a regulator implemented with conventional droop and the transient reduction network 601. In the conventional case illustrated, VOUT drops to the ACLL level and then recovers quickly to the DCLL level. When load insertion and release occurs at a relatively low repetition rate, such as 100 Hertz (Hz), the amount of energy loss due to repetitive conduction of Q5 results in a relative modest amount of power loss, such as less than 1 Watt (W) or even down to as little as 1 milliwatt (mW). As the load transient repetition rate increases, however, the amount of power loss increases proportionately for the conventional droop configuration. Certain microprocessor configurations may have a repetitive load rate of up to 10 megahertz (MHz), which may result in power loss of 100 W or more (e.g., see FIG. 10). The dynamic droop as described herein substantially reduces power loss due to overshoot/undershoot reduction as further described herein.

Figure 8:
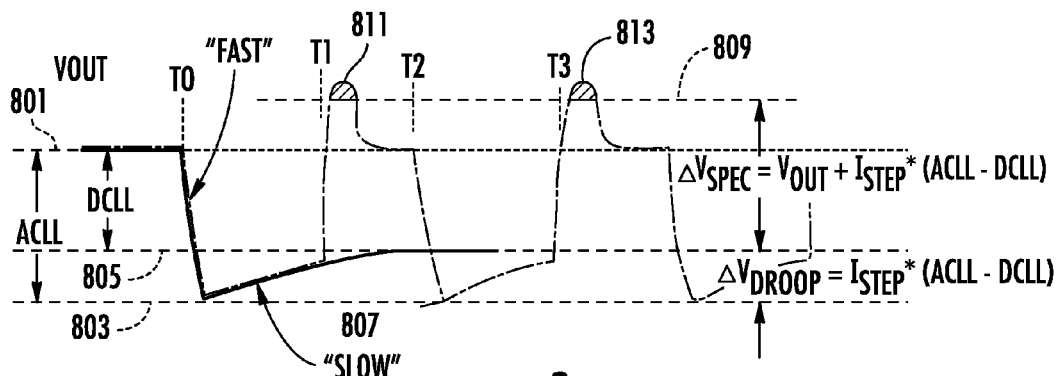
FIG. 8 is a graphic depiction illustrating energy loss for a configuration with dynamic droop as described herein, such as the regulator of FIG. 1, including the transient reduction network of FIG. 6 at a low to moderate transient repetition rate.

FIG. 8 is a graphic depiction illustrating energy loss for a configuration with dynamic droop as described herein, such as the regulator 102, including the transient reduction network 601 at a low to moderate transient repetition rate. VOUT is initially at a steady state voltage level 801 indicative of light or no load conditions. In response to a load insertion at about time t0, VOUT drops relatively fast to a low voltage level 803 determined by the AC load line (ACLL) specification. In the conventional configuration as shown in FIG. 7, VOUT returns quickly to a voltage level 805 determined by the DC load line (DCLL) specification. Instead, as shown in FIG. 8, the dynamic droop causes VOUT to rise more slowly as shown at 807. When VOUT almost reaches the DCLL voltage level 805, a load release event occurs at time t1 causing VOUT to rise quickly to a higher voltage level 809 based on the ACLL specification. VOUT would normally overshoot the higher voltage level 809 to a peak 811. The transient reduction network 601, however, operates to reduce the peak 811 so that VOUT does not exceed 809 by an appreciable amount.

VOUT then returns to the original steady state voltage level 801, and then another load insertion occurs at about time t2. VOUT again drops to the low voltage level 803 and rises at the same rate determined by dynamic droop to the DCLL 805. Operation repeats at the same rate in which another load release occurs at about time t3 resulting in another reduced peak 813. Since the transient repetition rate is at a low to moderate rate, the reduced peaks occur at a relatively low rate resulting in a relatively low amount of energy loss caused by peak transient reduction.

Figure 9:
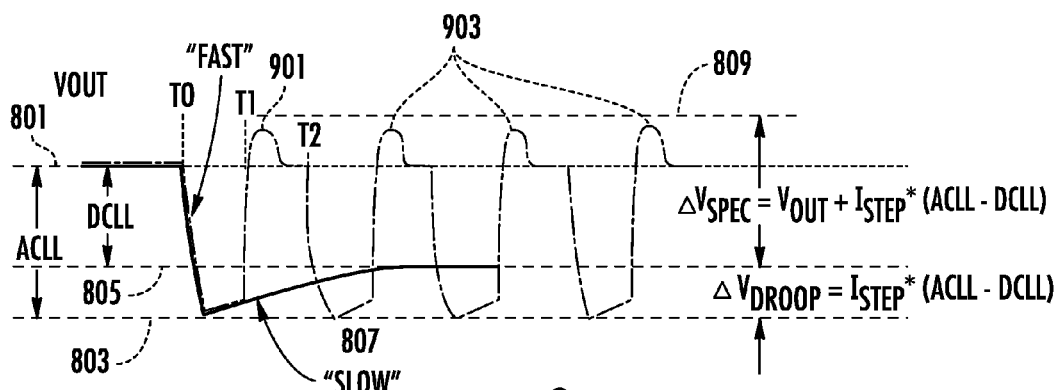
FIG. 9 is a graphic depiction illustrating energy loss for a configuration with dynamic droop as described herein, such as the regulator of FIG. 1, including the transient reduction network of FIG. 6 at a relatively high transient repetition rate.

FIG. 9 is a graphic depiction illustrating energy loss for a configuration with dynamic droop as described herein, such as the regulator 102, including the transient reduction network 601 at a relatively high transient repetition rate. Again, VOUT is initially at a steady state voltage level 801 indicative of light or no load conditions. In response to a load insertion at about time t0, VOUT drops relatively fast to a low voltage level 803 determined by the ACLL specification, and then rises slowly (compared to conventional configuration) based on dynamic droop as shown at 807. In this case, however, a load release occurs at time t1 before VOUT reaches the DCLL voltage level 805, causing VOUT to reach a peak 901. In this case, since the load release occurred while VOUT was significantly below the voltage level 805 when the load release occurred, the peak 901 does not exceed the higher voltage level 809. In this case, the transient reduction network 601 does not modify the peak 901 and there is no energy loss due to transient reduction.

VOUT then returns to the steady state voltage level 801 and another load assertion occurs at about time t2. Operation repeats at the higher transient repetition rate resulting in subsequent repetitive peaks 903, each below the higher voltage level 809. Since each of the peaks 901 and 903 are below the higher voltage level 809, the transient reduction network 601 does not reduce peaks and there is no energy loss due to transient reduction at the higher transient repetition rate.

FIG. 10 is a chart plotting power loss (in Watts, W) versus load repetition rate (Hz) for a particular configuration. A first plot shown at 1001 illustrates the power loss for a regulator implemented with conventional droop and a transient reduction network. When the load transient repetition rate exceeds about 3-5 kilohertz (KHz), the power loss in the transient reduction network due to reduction of transition peaks continues to increase until the power loss reaches about 100 W at a rate of about 10 MHz. A second plot shown at 1003 illustrates the power loss deviation from the conventional case for a regulator implemented with dynamic droop as described herein. In this case, when the load transient repetition rate reaches 3-5 KHz, the power loss peaks at about 50 mW. When the rate exceeds 3-5 KHz the power loss decreases and eventually reaches zero at the higher load transient repetition rates.

FIG. 11 is a block diagram of a transient reduction network 1101 implemented according to an alternative embodiment which combines the functions of the transient reduction networks 601 and 605. The transient reduction network 1101 includes MOSFETs Q7 and Q8 having their sources coupled together and their drains coupled on either end of the inductor L. In particular, the drain of Q7 is coupled to the phase node 203 and the drain of Q8 is coupled to the output node 205 of the regulator 102. The gates of Q7 and Q8 are coupled together and driven by a detection control and gate drive network 1103. The detection control and gate drive network 1103 detects or otherwise receives VREF and VOUT. The transient reduction network 1101 further includes a duty cycle detection network 1105 receiving VIN and VOUT and providing a duty cycle type (DCT) signal to the detection control and gate drive network 1103.

In operation, the duty cycle detection network 1105 compares the ratio of VIN and VOUT and asserts DCT to indicate whether the application is the low duty cycle type or the high duty cycle type. The detection control and gate drive network 1103 compares VOUT with VREF and turns on Q7 and Q8 to temporarily short inductor L to reduce a peak voltage when VOUT deviates from VREF by a predetermined amount. When DCT indicates the low duty cycle application, the detection control and gate drive network 1103 turns on Q7 and Q8 when VOUT exceeds VREF by a predetermined amount to temporarily short inductor L to reduce an undesired transient overshoot in a similar manner as previously described for the transient reduction network 601. When DCT indicates the high duty cycle application, the detection control and gate drive network 1103 turns on Q7 and Q8 when VOUT falls below VREF by a predetermined amount to reduce an undesired transient undershoot in a similar manner as previously described for the transient reduction network 605. The back-to-back series coupling of Q7 and Q8 otherwise prevents either internal diode from shorting the inductor L during normal operation when Q7 and Q8 are off. The inductor L is shorted only when the detection control and gate drive network 1103 turns on Q7 and Q8 for transient reduction.

FIG. 12 is a block diagram of a transient reduction network 1201 implemented according to another alternative embodiment which combines the functions of the transient reduction networks 601 and 605. The transient reduction network 1201 is configured in substantially similar manner as the transient reduction network 1101 except that Q7 and Q8 are replaced by a single MOSFET Q9. Q9 has its drain coupled to node 203, its source coupled to node 205. Furthermore, the substrate (or bulk) connection of Q9 externally coupled to a reference voltage level, such as GND, to remove the effects of its internal diode to prevent shorting the inductor L when Q9 is off. The inductor L is shorted only when the detection control and gate drive network 1103 turns on Q9 for transient reduction. The transient reduction network 1201 otherwise operates in substantially the same manner as the transient reduction network 1101.

A regulator system with dynamic droop according to one embodiment includes a regulator control network which is adapted to control regulation of an output voltage to a reference level, a DC droop network which provides a droop signal to modify the reference level based on output load according to a predetermined DC load line, and a dynamic droop network which adjusts the droop signal to delay recovery to the predetermined DC load line within an AC load line tolerance in response to a load transient. A transient reduction network may be included to reduce transient overshoot for load insertion or release depending upon duty cycle type. The dynamic droop network adjusts the droop signal to optimize utilization of an AC delay parameter while transitioning between an AC offset voltage allowance and the predetermined DC load line.

A method of controlling a regulator system with dynamic droop according to one embodiment includes regulating an output voltage to a reference level, modifying the reference level based on output load according to a predetermined DC load line, detecting a load transient, and adjusting the modified reference level to delay recovery to the predetermined DC load line within an AC load line tolerance in response to the load transient.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A regulator system with dynamic droop, comprising:
a regulator control network which is adapted to control regulation of an output voltage to a reference level;
a DC droop network which provides a droop signal to modify said reference level based on output load according to a predetermined DC load line within a fast recovery time; and
a dynamic droop network which adjusts said droop signal to delay recovery of said output voltage to said predetermined DC load line to optimize utilization of an AC load line tolerance while remaining within said AC load line tolerance in response to a load transient, wherein said AC load line tolerance specifies an allowed recovery time, and wherein said dynamic droop network delays recovery to a slow recovery time which is longer than said fast recovery time and no longer than said allowed recovery time.

2. The regulator system of claim 1, wherein said regulator control network operates according to a low duty cycle application, and wherein said dynamic droop network adjusts said droop signal in response to a load insertion transient.

3. The regulator system of claim 2, further comprising a transient reduction network which draws current from an output node while voltage of said output node exceeds said predetermined DC load line in response to a load release transient.

4. The regulator system of claim 1, wherein said regulator control network operates according to a high duty cycle application, and wherein said dynamic droop network adjusts said droop signal in response to a load release transient.

5. The regulator system of claim 4, further comprising a transient reduction network which provides current to an output node while voltage of said output node is below said predetermined DC load line in response to a load insertion transient.

6. The regulator system of claim 1, further comprising:
a duty cycle detection network which determines a duty cycle application type based on a relationship between an input voltage and an output voltage and which provides a duty cycle type signal indicative thereof;
a detection network which temporarily asserts a transient reduction signal when said duty cycle type signal indicates a low duty cycle and while voltage of said output node exceeds said predetermined DC load line in response to a load release transient, and which temporarily asserts said transient reduction signal when said duty cycle type signal indicates a high duty cycle and while voltage of said output node falls below said predetermined DC load line in response to a load insertion transient; and
at least one switch adapted for conducting current in parallel with an output inductor while said transient reduction signal is asserted.

7. The regulator system of claim 1, wherein said dynamic droop network adjusts said droop signal to optimize utilization of an AC delay parameter while transitioning between an AC offset voltage allowance and said predetermined DC load line.

8. The regulator system of claim 1, wherein said dynamic droop network comprises:
an adder which adds a droop adjust signal to said droop signal to provide a modified droop signal; and
a charging network which develops said droop adjust signal, wherein said charging network increases a magnitude of said droop adjust signal based on a difference between input voltage and output voltage, and decreases said magnitude of said droop adjust signal based on a resistor-capacitor time constant.

9. An electronic device, comprising:
a compensation and comparator network which compares an output voltage sense signal with a reference signal for providing a compensation signal indicative thereof and which develops a pulse control signal based on said compensation signal for controlling an output voltage;
a droop network which develops a droop signal to modify said output voltage sense signal based on output load according to a predetermined DC load line within a fast recovery time; and
a dynamic droop network which adjusts said droop signal to delay recovery of said output voltage to said predetermined DC load line to optimize utilization of an AC load line tolerance while remaining within said AC load line tolerance in response to a load transient, wherein said AC load line tolerance specifies an allowed recovery time, and wherein said dynamic droop network delays recovery to a slow recovery time which is longer than said fast recovery time and no longer than said allowed recovery time.

10. The electronic device of claim 9, further comprising:
an output node developing said output voltage; and
a load coupled to said output node.

11. The electronic device of claim 10, wherein said load comprises a processor coupled to a memory.

12. The electronic device of claim 9, wherein said compensation and comparator network operates according to a low duty cycle type, wherein said dynamic droop network adjusts said droop signal in response to a load insertion transient, and further comprising a transient reduction network which draws current to from an output node while voltage of said output node exceeds said predetermined DC load line in response to a load release transient.

13. The electronic device of claim 9, wherein said compensation and comparator network operates according to a high duty cycle type, wherein said dynamic droop network adjusts said droop signal in response to a load release transient, and further comprising a transient reduction network which provides current to an output node while voltage of said output node is below said predetermined DC load line in response to a load insertion transient.

14. The electronic device of claim 9, further comprising:
a duty cycle detection network which determines a duty cycle type based on an input voltage compared with an output voltage and which provides a duty cycle type signal indicative thereof;
a detection network which temporarily asserts a transient reduction signal when said duty cycle type signal indicates a low duty cycle type and while voltage of said output node exceeds said predetermined DC load line in response to a load release transient, and which temporarily asserts said transient reduction signal when said duty cycle type signal indicates a high duty cycle type and while voltage of said output node is below said predetermined DC load line in response to a load insertion transient; and
at least one switch adapted for conducting current in parallel with an output inductor while said transient reduction signal is asserted.

15. A method of controlling a regulator system with dynamic droop, comprising:
- regulating an output voltage to a reference level;
- modifying the reference level based on output load according to a predetermined DC load line within a fast recovery time;
- detecting a load transient; and
- adjusting the modified reference level to delay recovery of the output voltage to the predetermined DC load line to optimize utilization of an AC load line tolerance while remaining within said AC load line tolerance in response to the load transient, wherein the AC load line tolerance specifies an allowed recovery time, and wherein said adjusting the modified reference level comprises delaying recovery of the output voltage to a slow recovery time which is longer than the fast recovery time and no longer than the allowed recovery time.

16. The method of claim 15, wherein said detecting a load transient comprises detecting one of a load insertion transient and a load release transient, and wherein said adjusting the modified reference level comprises adjusting the modified reference level in response to a load insertion transient.

17. The method of claim 16, further comprising drawing current from an output node while output voltage exceeds the predetermined DC load line in response to a load release transient.

18. The method of claim 15, wherein said detecting a load transient comprises detecting one of a load insertion transient and a load release transient, and wherein said adjusting the modified reference level comprises adjusting the modified reference level in response to a load release transient.

19. The method of claim 18, further comprising providing current to an output node while output voltage is below the predetermined DC load line in response to a load insertion transient.

20. The method of claim 15, further comprising:
- determining a duty cycle type based on an input voltage compared with an output voltage;
- conducting current in parallel with an output inductor to adjust output voltage when the duty cycle type signal indicates a low duty cycle type and while the output voltage exceeds the predetermined DC load line in response to a load release transient; and
- conducting current in parallel with the output inductor to adjust output voltage when the duty cycle type signal indicates a high duty cycle type and while the output voltage is below the predetermined DC load line in response to a load insertion transient.

* * * * *